United States Patent
Srinivasarangan et al.

(10) Patent No.: US 11,823,148 B2
(45) Date of Patent: *Nov. 21, 2023

(54) AUGMENTED REALITY-ENABLED ATM FOR SECURE AUGMENTED REALITY CHECK REALIZATION

(71) Applicant: Bank of America Corporation, Charlotte, NC (US)

(72) Inventors: Anantharajan Srinivasarangan, Chennai (IN); Deepak Suresh Dhokane, Maharashtra (IN); Rakesh Kumar Jain, Chennai (IN); Ananth Subramanian, Tamil Nadu (IN); Kiran Pulla, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 195 days.

This patent is subject to a terminal disclaimer.

(21) Appl. No.: 17/231,961

(22) Filed: Apr. 15, 2021

(65) Prior Publication Data

US 2022/0335395 A1   Oct. 20, 2022

(51) Int. Cl.
*G06Q 20/10* (2012.01)
*G06Q 20/20* (2012.01)
(Continued)

(52) U.S. Cl.
CPC ....... *G06Q 20/1085* (2013.01); *G06Q 20/208* (2013.01); *G06Q 20/321* (2020.05);
(Continued)

(58) Field of Classification Search
CPC ............. G06Q 20/1085; G06Q 20/321; G06Q 20/208; G06Q 20/3274; G06Q 20/4012;
(Continued)

(56) References Cited

U.S. PATENT DOCUMENTS 6,243,501 B1 *   6/2001   Jamali ................ G06V 30/1444
715/209
6,464,134 B1 * 10/2002   Page .................... G07D 7/0047
235/375

(Continued)

OTHER PUBLICATIONS

Lawrence D. Jackel et al., Optical Character Recognition for Self-Service Banking, Jul. 1995, AT&T Technical Journal, pp. 16-24 (Year: 1995).*

(Continued)

*Primary Examiner* — Nilesh B Khatri

(57) ABSTRACT

An Augmented Reality (AR)-enabled Automated Teller Machine (ATM) receives a request to dispense cash equal to amount of an AR document. The AR document comprises an AR check. The AR-enabled ATM fetches a first AR check image from a memory. The AR-enabled ATM extracts a first set of features from the first AR check image. The AR-enabled ATM receives a second AR check image from a computing device associated with the receiver. The AR-enabled ATM extracts a second set of features from the second AR check image. The AR-enabled ATM compares the first AR check image with the second AR check image. The AR-enabled ATM determines whether the first AR check image corresponds to the second AR check image. In response to determining that the first AR check image corresponds to the second AR check image, the AR-enabled ATM dispenses cash equal to the amount.

20 Claims, 5 Drawing Sheets

(51) Int. Cl.
  *G07F 19/00* (2006.01)
  *G06Q 20/32* (2012.01)
  *G06Q 20/40* (2012.01)
  *G06T 19/00* (2011.01)
  *G07D 11/14* (2019.01)
  *G06V 30/416* (2022.01)
  *G06V 30/418* (2022.01)

(52) U.S. Cl.
  CPC ..... *G06Q 20/3274* (2013.01); *G06Q 20/4012* (2013.01); *G06T 19/006* (2013.01); *G06V 30/416* (2022.01); *G06V 30/418* (2022.01); *G07D 11/14* (2019.01); *G07F 19/203* (2013.01); *G07F 19/206* (2013.01); *G07D 2211/00* (2013.01)

(58) Field of Classification Search
  CPC .. G07D 11/14; G07D 2211/00; G06V 30/418; G06V 30/416; G06T 19/006; G06F 19/203; G07F 19/206
  See application file for complete search history.

(56) References Cited

U.S. PATENT DOCUMENTS

| | | | |
|---|---|---|---|
| 8,332,329 B1* | 12/2012 | Thiele | G06Q 20/3221 705/64 |
| 9,779,392 B1* | 10/2017 | Prasad | G06Q 20/10 |
| 9,959,694 B2 | 5/2018 | Lindsay | |
| 10,022,613 B2 | 7/2018 | Tran et al. | |
| 10,037,421 B2 | 7/2018 | Turgeman et al. | |
| 10,068,273 B2 | 9/2018 | Frehn et al. | |
| 10,069,852 B2 | 9/2018 | Turgeman et al. | |
| 10,078,820 B2 | 9/2018 | Renke et al. | |
| 10,083,439 B2 | 9/2018 | Turgeman et al. | |
| 10,088,846 B2 | 10/2018 | Gao et al. | |
| 10,095,833 B2 | 10/2018 | Balram et al. | |
| 10,104,098 B2 | 10/2018 | Baxley et al. | |
| 10,136,260 B2 | 11/2018 | Parulski et al. | |
| 10,149,958 B1 | 12/2018 | Tran et al. | |
| 10,156,900 B2 | 12/2018 | Publicover et al. | |
| 10,176,642 B2 | 1/2019 | Tran et al. | |
| 10,219,026 B2 | 2/2019 | Eim et al. | |
| 10,219,736 B2 | 3/2019 | Davis et al. | |
| 10,268,891 B2 | 4/2019 | Caiman et al. | |
| 10,291,646 B2 | 5/2019 | Stolarz et al. | |
| 10,311,646 B1* | 6/2019 | Wurmfeld | G06T 19/006 |
| 10,341,490 B2 | 7/2019 | Im et al. | |
| 10,341,701 B2 | 7/2019 | Hirsch et al. | |
| 10,361,900 B2 | 7/2019 | Jung et al. | |
| 10,382,533 B2 | 8/2019 | Soon-Shiong | |
| 10,417,677 B2 | 9/2019 | Glass et al. | |
| 10,431,003 B2 | 10/2019 | Rogers et al. | |
| 10,445,525 B2 | 10/2019 | Lovin | |
| 10,445,643 B2 | 10/2019 | Katz et al. | |
| 10,476,873 B2 | 11/2019 | Turgeman et al. | |
| 10,482,228 B2 | 11/2019 | Welsh et al. | |
| 10,565,621 B2 | 2/2020 | DeWitt et al. | |
| 10,600,285 B2 | 3/2020 | Webb | |
| 10,614,029 B2 | 4/2020 | DiRienzo | |
| 10,621,585 B2 | 4/2020 | Turgeman et al. | |
| 10,643,210 B2 | 5/2020 | Smith et al. | |
| 10,657,610 B2 | 5/2020 | Lerick et al. | |
| 10,666,784 B2 | 5/2020 | Rhoads et al. | |
| 10,672,018 B2 | 6/2020 | Carlson et al. | |
| 10,685,355 B2 | 6/2020 | Novick et al. | |
| 10,706,465 B2 | 7/2020 | D'Souza et al. | |
| 10,719,078 B2 | 7/2020 | Ferguson et al. | |
| 10,728,761 B2 | 7/2020 | Kedem et al. | |
| 10,733,588 B1 | 8/2020 | Mocko et al. | |
| 10,755,275 B1 | 8/2020 | Jen et al. | |
| 10,785,365 B2 | 9/2020 | Rodriguez et al. | |
| 10,789,816 B2 | 9/2020 | Pierce et al. | |
| 10,810,650 B2 | 10/2020 | Kumar et al. | |
| 10,825,295 B2 | 11/2020 | Simons | |
| 10,834,090 B2 | 11/2020 | Turgeman et al. | |
| 10,841,292 B2 | 11/2020 | Soon-Shiong | |
| 10,909,441 B2 | 2/2021 | Gao et al. | |
| 11,410,194 B1* | 8/2022 | Goetz | G06K 7/1413 |
| 2015/0371445 A1 | 12/2015 | Karrer Walker et al. | |
| 2020/0380521 A1* | 12/2020 | Navarro | G06Q 20/24 |

OTHER PUBLICATIONS

Abdulrahman Alhothaily et al., QuickCash: Secure Transfer Payment Systems, Jun. 13, 2017, Sensors (Basel), pp. 1-20 (Year: 2017).*

Srinivasarangan, A. et al., "Information Security System and Method for Augmented Reality Check Generation," U.S. Appl. No. 17/231,632, filed Apr. 15, 2021, 52 pages.

Srinivasarangan, A. et al., "Information Security System and Method for Augmented Reality Check Realization," U.S. Appl. No. 17/231,785, filed Apr. 15, 2021, 52 pages.

* cited by examiner

AUGMENTED REALITY-ENABLED ATM FOR SECURE AUGMENTED REALITY CHECK REALIZATION

TECHNICAL FIELD

The present disclosure relates generally to information security, and more specifically to an augmented reality-enabled ATM for secure augmented reality check realization.

BACKGROUND

It is challenging to verify documents to determine whether a document has been tampered with. In some cases, a document may not be verified because of signature mismatching, the name of a sender mismatching, the name of a receiver mismatching, among other issues. Current information security and document processing technologies are prone to such mismatches and mistakes in the document verification process. In addition, currently used paper documents are prone to security vulnerability and unauthorized access from bad actors since paper documents can be physically fabricated, manipulated, and tampered with. Current information security and document processing and verification technologies are not configured to provide a reliable and efficient document processing and verification solution.

SUMMARY

Current document processing and information security technologies are not configured to provide a reliable and efficient solution for document verification. This disclosure contemplates systems and methods for leveraging Augmented Reality (AR) technology for generating, verifying, and realizing AR documents. An example of an AR document includes, but is not limited to, an AR check, an AR gift card, an AR ticket, etc. The disclosed system generates an AR documents that is represented as a virtual or digital image on a view of a camera. For example, in addition to the background view of the camera, the AR documents can be seen when the camera shows an environment in front of the camera. The AR documents can be viewed as a three-dimensional image.

For example, in case where the AR document comprises an AR check, the disclosed system may generate an AR check in response to receiving a request to generate the AR check with a particular amount directed to a particular receiver. For example, the disclosed system may receive the request to generate the AR check from a computing device associated with a sender of the AR check. Upon receiving the request, the disclosed system associates a session identification (ID) to the AR check to keep track of the status of the AR check. The AR check may include a number uniquely identifying the AR check.

To generate the AR check, the disclosed system may generate a unique code by converting data related to the sender of the AR check (e.g., name, login credential, etc.), data related to the receiver of the AR check (e.g., name, login credential, etc.), the amount of the AR check, a serial number associated with the AR check, and the session ID into a hexadecimal format. In other examples, the disclosed system may generate the unique code by converting the data listed above into a binary format or any other data format. The disclosed system may obtain the data related to the sender, the amount, and the data related to the receiver from the request and/or a user profile database.

The disclosed system generates the AR check based on the unique code. In this process, the disclosed system extracts data that may be displayed or digitally written on the AR check from the unique code, such as the name of the sender, the name of the receiver, the amount, and the serial number associated with the AR check. Upon extracting this data from the unique code, the disclosed system displays or writes them on the AR check. To this end, the disclosed system may use multimedia elements, such as numbers, alphabet letters, and symbols to display the data extracted from the unique code on the AR check. For example, the disclosed system may use a first string of alphabet letters to display the name of the sender, a second string of alphabet letters to display the name of the receiver, a first set of numbers to display the amount, and a second set of numbers to display the serial number on the AR check.

The disclosed system may transmit the AR check to the receiver of the AR check in a variety of methods, as described below.

In one embodiment, the disclosed system may send a deep-link directed to a first AR check image to a computing device associated with the receiver of the AR check, via a text message, an email, and the like. The deep-link directed to the first AR check image is a hyperlink directed to the first AR check image. When the deep-link is accessed, the receiver may be verified from a software application used for accessing an account of the receiver, for example, by verifying login credentials, voice features, facial features, fingerprint features, and/or a magnetically encoded card associated with the receiver. Upon authenticating the receiver, the first AR check image can be seen on the view of a camera associated with the receiver's computing device, where the view of the camera is displayed on a display screen of the receiver's computing device. The disclosed system may deposit or transfer the amount indicated on the AR check to the account of the receiver from the software application.

In another embodiment, in cases where a first computing device associated with the sender of the AR check is in a Device-to-Device (D2D) communication range from a second computing device associated with the receiver, the first AR check image may be transferred from the first computing device to the second computing device via wireless protocols, such as WIFI, Bluetooth, etc. In such cases, the sender may select the first AR check image on the view of a camera associated with the sender's computing device, such that the first AR check image can be seen on the view of the camera associated with the sender's computing device. The sender may then aim the camera toward a display screen associated with the receiver's computing device, such that at least a portion of the display screen of the receiver's computing device can be seen on the view of the camera of the sender's computing device. The first AR check image may be transferred or pasted on the display screen of the receiver's computing device in response to the sender initiating the transfer by selecting a "paste" option associated with the first AR check image being displayed on the view of the sender's camera. In this manner, the disclosed system may transfer the first AR check image from the sender's computing device to the receiver's computing device.

The disclosed system may realize the AR check in a variety of methods, as described below.

In one embodiment, the disclosed system may receive a second AR check image from the receiver's computing device. The disclosed system may extract features from the second AR check image by feeding the second AR check image to a machine learning algorithm, such as image processing, image segmentation, neural networks, etc. The features associated with the second AR check image may be represented by a test vector comprising numerical values. The features associated with the second AR check image may represent text, images, and numbers written on the second AR check image. Likewise, the disclosed system may extract features from the first AR check image. The features associated with the first AR check image may be represented by an initial vector comprising numerical values. The features associated with the first AR check image may include and/or represent text, images, and numbers written on the first AR check image. To determine whether the second AR check image corresponds to the first AR check image, the disclosed system compares the second AR check image with the first AR check image. In this process, the disclosed system compares each numerical value from the initial vector with its corresponding numerical value from the test vector. The disclosed system determines that the second AR check image corresponds to the first AR check image if it is determined that more than a threshold percentage of the numerical values from the test vector (e.g., 80%, 85%, etc.) are within a threshold range (e.g., ±5%, ±10%, etc.) from their corresponding numerical values from the initial vector. In response to determining that the second AR check image corresponds to the first AR check image, the disclosed system transfers the amount indicated on the AR check to an account associated with the receiver.

In another embodiment, the disclosed system may realize the AR check by dispensing cash equivalent to the amount of the AR check from an AR-enabled ATM. In this embodiment, the receiver may approach an AR-enabled ATM, select the image of the AR check on the view of the camera of their computing device, aim the camera toward a display screen of the AR-enabled ATM, such that at least a portion of the display screen of the AR-enabled ATM can be seen on the view of the camera of the receiver's computing device. The image of the AR check is transferred from the receiver's computing device to the AR-enabled ATM in response to the receiver initiating the transfer by selecting a "paste" option associated with the image of the AR check on the view of the receiver's camera.

The AR-enabled ATM scans the image of the AR check to extract and verify the name of the sender, the name of the receiver, the amount, the serial number, and other information associated with the AR check. In response to verifying the information extracted from the AR check, the AR-enabled ATM dispenses cash equivalent to the amount of the AR check from a cash dispenser for the receiver. Alternatively, the receiver may choose to deposit the amount to their account from the AR-enabled ATM. Thus, the AR-enabled ATM may transfer the amount to the receiver's account in response to the receiver selecting the deposit the amount option using the user interfaces of the AR-enabled ATM.

With respect to AR check generation, in one embodiment, a system for AR check generation comprises a processor and a memory. The processor receives a request to generate an AR check with a particular amount directed to a particular receiver. The processor associates a session identification (ID) to the AR check to keep track of the status of the AR check. The processor generates a unique code for the AR check, where generating the unique code comprises converting one or more of a name of a sender of the AR check, a name of the particular receiver, the session ID, the particular amount, and a serial number associated with the AR check into a data format comprising hexadecimal format.

The processor generates the AR check based at least upon the unique code as an input, where generating the AR check comprises processing the one or more of the name of the sender, the name of the particular receiver, the particular amount, and the serial number extracted from the unique code on the AR check using multimedia elements, such that the one or more of the name of the sender, the name of the particular receiver, the particular amount, and the serial number are displayed on the AR check. The multimedia elements comprise at least one of a set of alphabet letters and a set of numbers. The processor transmits an image of the AR check to a computing device associated with the particular receiver. The memory is operably coupled with the processor. The memory is operable to store the image of the AR check, wherein the image of the AR check is represented as a digitized image in a view of a camera in three-dimensional space.

With respect to AR check realization at a server, in one embodiment, a system for AR check realization comprises a memory and a processor. The memory is operable to store a first image of an AR check when the AR check is generated. The first image of the AR check is represented as a digital image in a view of a camera in three-dimensional space. The first image of the AR check displays a first set of features comprising at least one of a first string representing a name of a sender, a second string representing a name of a receiver, a first number representing an amount of the AR check, and a second number representing a serial number. The processor is operably coupled with the memory. The processor receives a request to realize the AR check by transferring the amount into an account associated with the receiver. The processor receives a second image of the AR check from a computing device associated with the receiver. The processor extracts a second set of features from the second image of the AR check, wherein the second set of features comprises at least one of a third string representing the name of the sender, a fourth string representing the name of the receiver, a third number representing the amount, and a fourth number representing the serial number. The processor compares the second image of the AR check with the first image of the AR check. The processor determines whether the second image of the AR check corresponds to the first image of the AR check. In response to determining that the second image of the AR check corresponds to the first image of the AR check, the processor transfers the amount into the account associated with the receiver.

With respect to AR check realization at an AR-enabled ATM, in one embodiment, the AR-enabled ATM comprises a memory and a processor. The memory is operable to store a first image of an AR check when the AR check is generated. The first image of the AR check is represented as a digital image in a view of a camera in three-dimensional space. The first image of the AR check displays a first set of features comprising at least one of a first string representing a name of a sender, a second string representing a name of a receiver, a first number representing an amount of the AR check, and a second number representing a serial number. The processor is operably coupled with the memory. The processor receives a request to realize the AR check by dispensing cash equal to the amount. The processor receives a second image of the AR check from a computing device associated with the receiver. The processor scans the second image of the AR check to extract a second set of features from the second image of the AR check, wherein the second set of features comprises at least one of a third string representing the name of the sender, a fourth string representing the name of the receiver, a third number representing the amount, a fourth number representing the serial number. The processor compares the second image of the AR check with the first image of the AR check. The processor determines whether the second image of the AR check corresponds to the first image of the AR check. In response to determining that the second image of the AR check corresponds to the first image of the AR check, the processor dispenses cash equal to the amount for the receiver.

The disclosed system provides several practical applications and technical advantages which include: 1) technology that generates an AR document (e.g., AR check) using data related to a sender of the AR document, data related to a receiver of the AR document, a session ID, and a serial number associated with the AR document; 2) technology that transmits the AR document to a computing device associated with the receiver by using a multi-factor authentication-enabled deep-link directed to an image of the AR document, where when the multi-factor authentication-enabled deep-link is accessed, the receiver is verified using the multi-factor authentication, and the image of the AR document is displayed on a view of a camera of the receiver's computing device; 3) technology that realizes the AR document (e.g., AR check) by comparing a first AR check image with a second AR check image, and determining whether the second AR check image corresponds to the first AR check image; 4) technology that implements D2D communication protocol to transfer an image of the AR check from the sender's computing device to the receiver's computing device; 5) technology that implements an AR-enabled ATM that is configured to receive an image of the AR check, scan and process the AR check, and dispense cash equivalent to the amount of the AR check to the receiver; and 6) technology that associates a flag parameter to the AR check upon generating the AR check, where the flag parameter indicates whether the AR check is realized or not, such that until the AR check is not realized, the flag parameter is set to an activated state, and when the AR check is realized, the flag parameter is set to a deactivated state.

As such, the disclosed system may improve the current document (e.g., check) generating, document (e.g., check) processing, document (e.g., check) verification, augmented reality, and information security technologies. For example, by generating AR checks, the disclosed system reduces the probability of security threat and security vulnerability that come with using 2D checks or paper checks. The 2D checks or paper checks can only provide features in the 2D space which may not be an accurate representation of the 2D checks or paper checks. Furthermore, 2D or paper checks may be prone to be tampered with by bad actors, signature mismatching, sender name mismatching, receiver name mismatching, and other security threats and security vulnerabilities. By generating AR checks, the disclosed system facilitates extracting more reliable and accurate features from the AR checks that more accurately represent the AR checks compared to 2D or paper checks.

Accordingly, the disclosed system may be integrated into a practical application of securing the AR check, information associated with the sender displayed on the AR check (e.g., name, account number, etc.), information associated with the receiver (e.g., name, account number, etc.) from unauthorized access, e.g., from bad actors. As such, the accounts of the sender and receiver are kept secure from data extraction, exfiltration, modification, destruction, etc.

The disclosed system may further be integrated into an additional practical application of improving underlying operations and security of computing systems tasked to oversee the accounts of the senders and receivers of the AR checks. For example, by securing the accounts of the senders and receivers, the computer systems tasked to oversee the accounts of the senders and receivers of the AR checks are kept secure from unauthorized access. In another example, the disclosed system may reduce processing, memory, and time resources for generating and realizing AR checks that would otherwise be spent using the current AR and check processing technologies.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
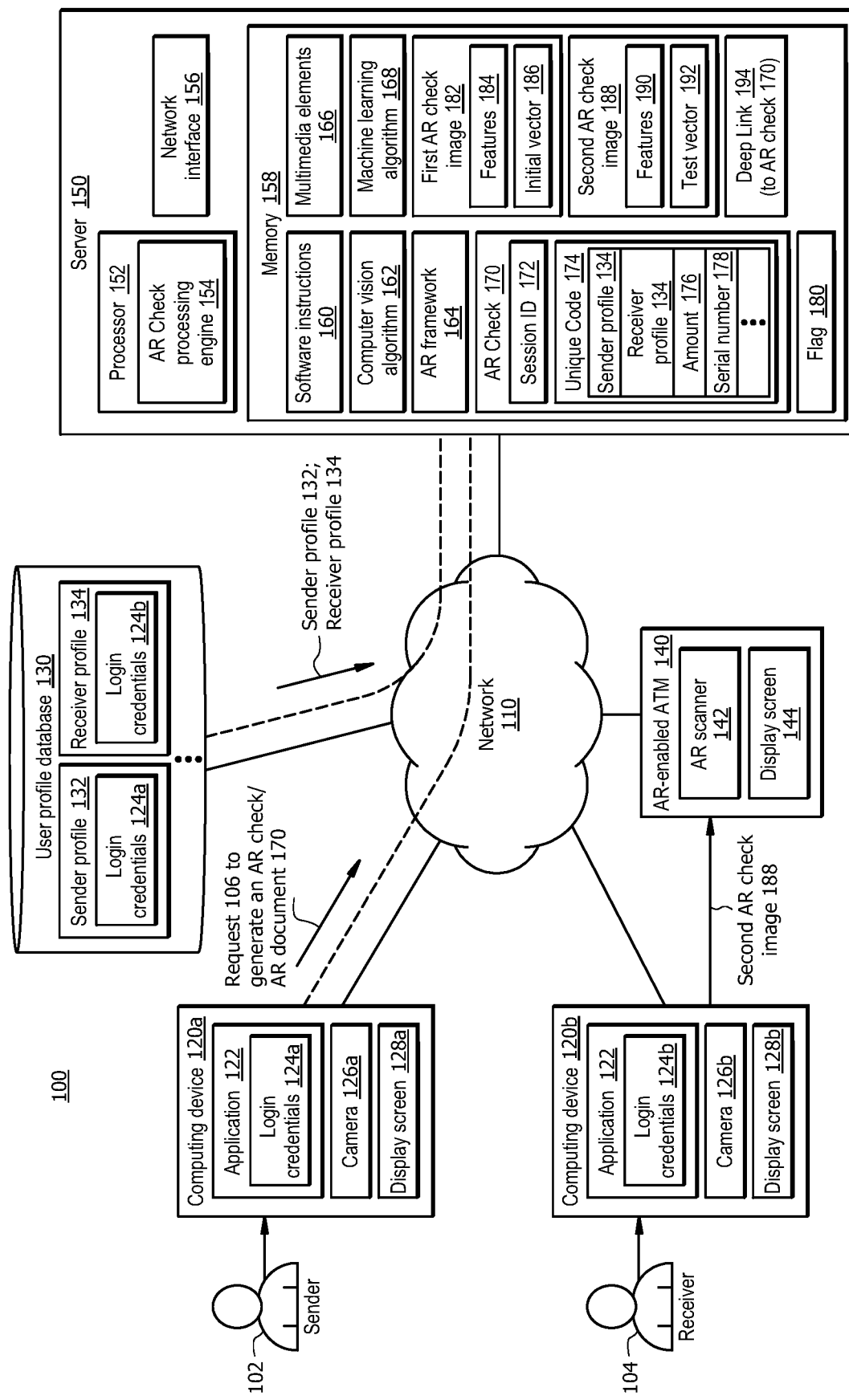
FIG. 1 illustrates an embodiment of a system configured for AR check generation and realization.

As described above, previous technologies fail to provide efficient, reliable, and safe solutions for generating, validating, and realizing AR checks. This disclosure provides various systems and methods for AR check generation, validation, and realization. In one embodiment, system 100 and method 200 for AR check generation at a server are described in FIGS. 1 and 2, respectively. In one embodiment, system 100 and method 300 for AR check validation and realization at a server are described in FIGS. 1 and 3, respectively. In one embodiment, system 400 and method 500 for AR check validation and realization at an AR-enabled ATM are described in FIGS. 4 and 5, respectively.

Example System for AR Check Generation, Validation, and Realization

FIG. 1 illustrates one embodiment of a system 100 that is configured to generate, validate, and realize AR documents 170. An example of an AR document 170 includes, but is not limited to, an AR check, an AR gift card, an AR ticket, etc. In one embodiment, system 100 comprises a server 150. In some embodiments, system 100 further comprises a network 110, one or more computing devices 120 (e.g., computing devices 120a and 120b), a user profile database 130, and an AR-enabled ATM 140. Network 110 enables communications between components of system 100. Server 150 comprises a processor 152 in signal communication with a memory 158. Memory 158 stores software instructions 160 that when executed by the processor 152 cause the processor 152 to perform one or more functions described herein. For example, when the software instructions 160 are executed, the processor 152 executes an AR check processing engine 154 to generate an AR check 170 in response to receiving a request 106 to generate the AR check 170 with a particular amount 176 directed to a particular receiver 104. In this disclosure, a particular example where the AR document 170 comprises an AR check 170 is disclosed. However, this disclosure is not limited to AR checks 170. In other embodiments, system 100 may not have all of the components listed and/or may have other elements instead of, or in addition to, those listed above.

System Components

Network 110 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Each computing device 120 (e.g., computing device 120a and 120b) is generally any device that is configured to process data and interact with senders 102 and receivers 104. Examples of computing device 120 include, but are not limited to, a personal computer, a desktop computer, a workstation, a server, a laptop, a tablet computer, a mobile phone (such as a smartphone), etc.

The sender 102 may use the computing device 120a to send the request 106 to the server 150 to generate an AR check 170 (e.g., via the application 122). The computing device 120a comprises a camera 126a operably coupled with a display screen 128a, such that when the camera 126a is turned on or activated, the view of the camera 126a is displayed on the display screen 128a. Upon the AR check processing engine 154 generating the AR check 170, the AR check 170 is visible on the view of the camera 126a as a digital or virtual image/object along with other objects in the background view of the camera 126a.

The receiver 104 may use the computing device 120b to receive the AR check 170. In one example, the receiver 104 may use user interfaces of the application 122 to request to transfer the amount 176 to their account. In another example, the receiver 104 may transfer the received AR check 170 to an AR-enabled ATM 140 to receive cash equivalent to the amount 176 or deposit the amount 176 to their account. The computing device 120b comprises a camera 126b operably coupled with a display screen 128b, such that when the camera 126b is turned on or activated, the view of the camera 126b is displayed on the display screen 128b. Upon receiving the AR check 170, the AR check 170 is visible on the view of the camera 126b as a digital or virtual image/object along with other objects in the background view of the camera 126b.

Application 122 is installed in each computing device 120. The application 122 may be a mobile, software, and/or web application 122 that the sender 102 and receiver 104 may log into to access their respective accounts. For example, the sender 102 uses login credentials 124a to log in to the application 122 to send a request 106 to generate an AR check 170. Similarly, the receiver 104 uses login credentials 124b to log into the application 122 to access their account and receive the AR check 170. The sender 102 and the receiver 104 may be verified using multi-factor authentication to be able to log into the application 122. For example, the multi-factor authentication may include verifying login credentials 124, voice features, facial features, fingerprint features, a magnetically encoded card, among others.

User profile database 130 generally comprises any storage architecture. Examples of the user profile database 130, include, but are not limited to, a network-attached storage cloud, a storage area network, a storage assembly directly (or indirectly) coupled to one or more components of the system 100. The user profile database 130 stores a sender profile 132 and receiver profile 134. The sender profile 132 stores login credentials 124a associated with the account of the sender 102 for logging into the application 122. The sender profile 132 may further store other information associated with the sender 102, including, but not limited to, a name, a phone number, an address, account information, historical requests 106, transactions, requested AR checks 170, among others. The receiver profile 134 stores login credentials 124b associated with the account of the receiver 104 for logging into the application 122. The receiver profile 134 may further store other information associated with the receiver 104, including, but not limited to, a name, a phone number, an address, account information, transactions, received AR checks 170, among others. The user profile database 130 may further store other sender profiles 132 and receiver profiles 134.

AR-Enabled ATM Terminal

AR-enabled ATM terminal 140 is generally any automated dispensing device configured to dispense items when users interact with the ATM terminal 140. In this disclosure, the AR-enabled ATM terminal 140 may interchangeably be referred to as an ATM terminal 140 or ATM 140. For example, the ATM terminal 140 may comprise a terminal device for dispensing cash, tickets, scrip, travelers' checks, airline tickets, other items of value, etc. In one embodiment, ATM terminal 140 is an automated teller machine that allows users (e.g., receivers 104) to withdraw cash, check balances, make deposits interactively using, for example, a magnetically encoded card, a check, etc., among other services that the ATM terminal 140 provides.

In one embodiment, the ATM terminal 140 is configured to receive and process AR checks 170. In other embodiments, the ATM terminal 140 may be configured to receive and process any AR item, such as an AR gift card, AR ticket, etc. This process is described further below in conjunction with the operational flow of the system 100.

The ATM terminal 140 comprises an AR scanner 142 operably coupled with a display screen 144.

The AR scanner 142 is generally configured to receive an image of an AR check 170 (or any AR item) from the computing device 120b, when the computing device 120b is within the Device-to-Device (D2D) communication range of the ATM terminal 140. The AR scanner 142 may be implemented in software and/or hardware modules of the ATM terminal 140. Upon receiving an image of the AR check 170, the ATM terminal 140 may scan the AR check 170 using the AR scanner 142 to extract and verify information on the AR check 170, including the name of the sender 102, the name of the receiver 104, the amount 176, the serial number 178, etc. This process is described further below in conjunction with the operational flow of the system 100.

The display screen 144 is generally any display screen, and configured to display objects, including AR and non-AR objects. When the receiver 104 wants to transfer the AR check 170 to the ATM terminal 140, the receiver 104 may access an image of the AR check 170 on the view of the camera 126b, and aim the camera 126b at the display screen 144, such that at least a portion of the display screen 144 can be seen on the view of the camera 126b. The image of the AR check 170 can be transferred to the display screen 144, for example, when the receiver 104 uses user interfaces of camera a126 to select a "paste" option on the image of the AR check 170 being displayed on the view of the camera 126*b*. Thus, the image of the AR check 170 is pasted on or transferred to the display screen 144. This process is described further below in conjunction with the operational flow of the system 100.

Server

Server 150 is generally a server or any other device configured to process data and communicate with computing devices (e.g., computing devices 120*a,b* and ATM terminals 140), databases (e.g., user profile database 130), etc., via the network 110. In one example, server 150 may be a backend server 150 associated with the application 122 and AR-enabled ATM terminal 140. The server 150 is generally configured to oversee operations of the AR check processing engine 154 as described further below.

Processor 152 comprises one or more processors operably coupled to the memory 158. The processor 152 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 152 may be a programmable logic device, a microcontroller, a microprocessor, or any suitable combination of the preceding. The one or more processors are configured to process data and may be implemented in hardware or software. For example, the processor 152 may be 8-bit, 16-bit, 32-bit, 64-bit, or of any other suitable architecture. The processor 152 may include an arithmetic logic unit (ALU) for performing arithmetic and logic operations, processor 152 registers the supply operands to the ALU and stores the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 160) to implement the AR check processing engine 154. In this way, processor 152 may be a special-purpose computer designed to implement the functions disclosed herein. In an embodiment, the processor 152 is implemented using logic units, FPGAs, ASICs, DSPs, or any other suitable hardware. The processor 152 is configured to operate as described in FIGS. 1-3. For example, the processor 152 may be configured to perform one or more steps of methods 200 and 300 as described in FIGS. 2 and 3, respectively.

Network interface 156 is configured to enable wired and/or wireless communications (e.g., via network 110). The network interface 156 is configured to communicate data between the server 150 and other devices (e.g., computing devices 120*a,b* and ATM terminals 140), databases (e.g., user profile database 130), systems, or domains. For example, the network interface 156 may comprise a WIFI interface, a local area network (LAN) interface, a wide area network (WAN) interface, a modem, a switch, or a router. The processor 152 is configured to send and receive data using the network interface 156. The network interface 156 may be configured to use any suitable type of communication protocol as would be appreciated by one of ordinary skill in the art.

Memory 158 may be volatile or non-volatile and may comprise a read-only memory (ROM), random-access memory (RAM), ternary content-addressable memory (TCAM), dynamic random-access memory (DRAM), and static random-access memory (SRAM). Memory 158 may be implemented using one or more disks, tape drives, solid-state drives, and/or the like. Memory 158 is operable to store the software instructions 160, computer vision algorithm 162, AR framework 164, multimedia elements 166, machine learning algorithm 168, AR checks 170, first AR check image 182, second AR check image 188, deep-links 194 (to images of AR checks 170), and/or any other data or instructions. The software instructions 160 may comprise any suitable set of instructions, logic, rules, or code operable to execute the processor 152.

AR Check Processing Engine

AR check processing engine 154 may be implemented by the processor 152 executing software instructions 160, and is generally configured to generate, validate, and realize AR checks 170. The corresponding description below described some operations of the AR check processing engine 154 with respect to generating AR checks 170. Other operations of the AR check processing engine 154, including validating and realizing an AR check 170, are described further below in conjunction with the operational flow of the system 100, method 200 described in FIG. 2, and method 300 described in FIG. 3.

In one embodiment, the AR check processing engine 154 may use a computer vision algorithm 162, such as image processing, image augmentation, image rendering in virtual 3D space, 3D geometric representation algorithm, etc., to generate an AR check 170. To this end, the AR check processing engine 154 may implement the computer vision algorithm 162 in an AR framework 164.

The AR framework 164 provides support for executing the computer vision algorithm 162. The AR framework 164 may include a software application, an application instance, and/or application process that provides a virtual 3D simulation environment for implementing the computer vision algorithm 162 to generate the AR check 170 (and any other AR item).

To generate an AR check 170, the AR check processing engine 154 generates a unique code 174 from data indicated in a request 106 (e.g., the name of the receiver 104 and the amount 176) and session ID 172. For example, the AR check processing engine 154 may generate the unique code 174 using the session ID 172, sender profile 132, receiver profile 134, and serial number 178 associated with the AR check 170.

In one embodiment, the AR check processing engine 154 may generate the unique code 174 by converting the data indicated in a request 106 and the session ID 172 into a hexadecimal format. In other embodiments, the AR check processing engine 154 may generate the unique code 174 by converting the data indicated in a request 106 and the session ID 172 into a binary format or any other data format.

To generate the unique code 174, the AR check processing engine 154 may be implemented by an Object-Oriented Programming (OOP) language to treat or define each of the data indicated in the request 106 and the session ID 172 as an object. Similarly, the AR check processing engine 154 may further define the sender profile 132 (e.g., login credentials 124*a*, etc.), receiver profile 134 (e.g., login credentials 124*b*, etc.), and the serial number 178, fetched from the user profile database 130, as objects. The AR check processing engine 154 may feed these objects to a hash function to be converted into hexadecimal values, binary values, and the like. As such, the unique code 174 may include hexadecimal string, binary string, etc.

The AR check processing engine 154 feeds the unique code 174 to the computer vision algorithm 162 to generate the AR check 170. The AR check processing engine 154 executes the computer vision algorithm 162 to simulate a 3D virtual image of the AR check 170 in the AR framework 164. In this process, the AR check processing engine 154 (via the computer vision algorithm 162) displays a pre-prepared template 3D virtual image of a check (e.g., a blank check) in the AR framework 164. The AR check processing engine 154 extracts the name of sender 102, name of the receiver 104, amount 176, serial number 178, and other data from the unique code 174, and executes the computer vision algorithm 162 to digitalize them, and display them on the 3D virtual image of the AR check 170 in the AR framework 164.

As the AR check 170 moves (or is moved) in the 3D virtual environment in the AR framework 164, the AR check processing engine 154 adjusts the dimensions, orientations, sizes, and spatial geometry of the name of sender 102, name of the receiver 104, amount 176, serial number 178, date, etc., simultaneously with the dimension, orientation, size, and spatial geometry of the AR check 170. As such, the AR check 170 may appear as a digital 3D object from various angles or points of view.

The AR check processing engine 154 may use multimedia elements 166 to display the name of sender 102, name of the receiver 104, amount 176, serial number 178, etc. on the AR check 170. The multimedia elements 166 may include numbers, letters, symbols, or anything that may be displayed on the AR check 170.

To display the name of sender 102, name of the receiver 104, amount 176, serial number 178, date, etc., on the AR check 170, the AR check processing engine 154 determines appropriate positions of these items on the AR check 170. The AR check processing engine 154 may determine the appropriate positions of these items on the AR check 170 using the computer vision algorithm 162 and/or any image processing algorithm to determine positions of text, numbers, images, symbols, and other objects on the AR check 170.

The AR check processing engine 154 may use a plurality of AR markers or points on the AR check 170 to determine appropriate positions of these items with respect to the plurality of AR markers. For example, a first AR marker may be positioned on one or more first pixels displaying "Payer:" or "Sender:" As such, the AR check processing engine 154 may determine that the appropriate position of the name of the sender 102 is on or starts with the first AR marker. Likewise, the AR check processing engine 154 determines the appropriate positions of the name of the receiver 104, amount 176, serial number, date, etc., on with respect to other AR markers on the AR check 170.

For example, the AR check processing engine 154 may use a first set of multimedia elements 166 (e.g., a first string of letters) to display the name of the sender 102 on the AR check 170 on an appreciate location on the AR check 170 dedicated for the sender 102 (e.g., indicated by a first AR marker representing "Payer:" or "Sender:"). In another example, the AR check processing engine 154 may use a second set of multimedia elements 166 (e.g., a second string of letters) to display the name of the receiver 104 on an appropriate location on the AR check 170 dedicated for the receiver 104 (e.g., indicated by a second AR marker representing "Payee:" or "Receiver:"). In another example, the AR check processing engine 154 may use a third set of multimedia elements 166 (e.g., a first number) to display the amount 176 on an appropriate location on the AR check 170 dedicated for the amount 176 (e.g., indicated by a third AR marker representing "Amount of:" or "Dollars"). In another example, the AR check processing engine 154 may use a fourth set of multimedia elements 166 (e.g., a second number) to display the serial number 178 on an appropriate location on the AR check 170 dedicated for the serial number 176 (e.g., indicated by a fourth AR marker). In this manner, the AR check processing engine 154 may generate the AR check 170.

The AR check processing engine 154 may associate a flag parameter 180 to the AR check 170. The flag parameter 180 indicates whether the AR check 170 is realized or not. For example, until the AR check 170 is not realized, the AR check processing engine 154 sets the flag parameter 180 to an activated state. When the AR check 170 is realized, the AR check processing engine 154 sets the flag parameter 180 to a deactivated state. The corresponding description below describes the operational flow of the system 100.

Operational Flow

The operational flow of the system 100 begins when the AR check processing engine 154 receives a request 106 to generate an AR check 170. For example, the request 106 may indicate to generate the AR check 170 with a particular amount 176 directed to a particular receiver 104.

Authenticating the Sender of the AR Check

The AR check processing engine 154 may receive the request 106 in response to verifying the sender 102 logging into the application 122 using multi-factor authentication, e.g., verifying login credentials 124a, voice features, facial features, fingerprint features, and a magnetically encoded card, among others. With respect to verifying login credentials 124a, the AR check processing engine 154 may verify the provided login credentials 124a by comparing the provided login credentials 124a with login credentials 124a stored in the sender profile 132. With respect to verifying the voice features of the sender 102, the AR check processing engine 154 may receive a sample voice of the sender 102 captured by a microphone associated with the computing device 120a, extract voice features (e.g., frequency, tone, pitch, pause patterns, speech patterns, etc.) from the captured sample voice of the sender 102, and compare the voice features with stored voice features associated with the sender 102 in the sender profile 132. With respect to verifying the facial features of the sender 102, the AR check processing engine 154 may receive an image of the sender 102 captured by the camera 126a, extract facial features (e.g., positions and shapes of eyes, eyebrows, cheeks, lips, facial hair, eyeglasses, etc.) from the captured image of the sender 102, and compare the facial features with stored facial features associated with the sender 102 in the sender profile 132. With respect to verifying the fingerprint of the sender 102, the AR check processing engine 154 may receive the fingerprint of the sender 102 from a fingerprint scanner associated with the computing device 120a, extract fingerprint pattern features from the captured fingerprint, and compare the extracted fingerprint pattern features with stored fingerprint pattern features associated with the sender 102 in the sender profile 132. With respect to verifying the magnetically encoded card associated with the sender 102, the AR check processing engine 154 may receive an image of the magnetically encoded card associated with the sender 102 captured by the camera 126a, determine an account number, name of the sender, and other information from the magnetically encoded card, and compare this information with the stored information associated with the sender 102 in the sender profile 132. The AR check processing engine 154 may use one or more of the authentication methods described above to authenticate the sender 102.

Generating the AR Check

Upon authenticating the sender 102, the AR check processing engine 154 associates a session ID 172 to the AR check 170 to keep track of the status of the AR check 170. The AR check processing engine 154 generates a unique code 174 for the AR check 170 by converting the name of the sender 102, the name of the receiver 104, the particular amount 176, serial number 178, and other data associated with the AR check 170 into a hexadecimal format, binary format, or any other data format, similar to that described above.

Upon generating the unique code 174, the AR check processing engine 154 feeds the unique code 174 to the computer vision algorithm 162 to determine various data embedded in the unique code 174, including the name of the sender 102, name of the receiver 104, the amount 176, and the serial number 178 by parsing the unique code 174, and converting the data extracted from the unique code 174 to a digital or augmented image, similar to that described above. The AR check processing engine 154 (via the computer vision algorithm 162) generates a 3D virtual/digital image of the AR check 170 in the AR framework 164, such that the AR check 170 is represented as a 3D virtual/digital object from various angles and points of view, similar to that described above. The AR check processing engine 154 may use multimedia elements 166 to overlay or display the name of the sender 102, the name of the receiver 104, the amount 176, the serial number 178, and/or any other object on the 3D virtual image of the AR check 170.

Transmitting the AR Check to the Receiver

Upon generating the AR check 170, the AR check processing engine 154 transmits the AR check 170 to the computing device 120b associated with the respective receiver 104. In this operation, the AR check processing engine 154 transmits the first AR check image 182 to the computing device 120b, such that the first AR check image 182 is visible on the view of the camera 126b on the display screen 128b.

The AR check processing engine 154 may determine the destination of the AR check 170 from the provided information in the request 106, as described above. For example, the contact information of the respective receiver 104 of the AR check 170 may be provided in the request 106, such as a phone number, an email address, an account number, and login credentials 124b, among others. The AR check processing engine 154 may transmit the first AR check image 182 to the computing device 120b using a variety of methods, as described below.

In one embodiment, the AR check processing engine 154 may transmit a deep-link 194 directed to the first AR check image 182 via a text message, an image message, an attachment file, an email, and the like. The deep-link 194 is a hyperlink directed to the first AR check image 182, such that when the deep-link 194 is accessed, the application 122 is opened and the first AR check image 182 is displayed on the foreground of the application 122 on the computing device 120b. The deep-link 194 may further be linked to application 122. The deep-link 194 may be enabled or associated with multi-factor authentication operations described above to verify the identity of the receiver 104. Thus, the deep-link 194 may be an multi-factor authentication-enabled deep-link 194.

In an alternative embodiment, in cases where the computing device 120a (associated with the sender 102) and the computing device 120b (associated with the receiver 104) are in D2D communication range from each other, the AR check processing engine 154 may transmit the first AR check image 182 to the computing device 120a. The sender 102 may transfer the first AR check image 182 from the computing device 120a to the computing device 120b via wireless communication, such as WIFI, Bluetooth, etc. For example, the AR check processing engine 154 may transmit the first AR check image 182 to the computing device 120a in response to receiving a request from the sender 102 to send the first AR check image 182 by using user interfaces of the application 122. Upon receiving the first AR check image 182, the sender 102 may select a D2D transmission option from the user interfaces of the application 122 to directly transmit the first AR check image 182 to the computing device 120b. In this process, the sender 102 may activate the camera 126a and access the first AR check image 182 on the view of the camera 126a, such that the first AR check image 182 is displayed on the display screen 128a on the view of the camera 126a. The sender 102 may aim the camera 126a toward the display screen 128b, such that at least a portion of the display screen 128b can be seen on the view of the camera 126a displayed on the display screen 128a. The first AR check image 108 (displayed on the view of the camera 126a aimed toward the display screen 128b) is transferred to the computing device 120b, in response to the sender 102 initiating the transfer by selecting a "paste" option associated with the first AR check image 182 on the view of the camera 126a. Upon transmission of the first AR check image 182, the first AR check image 182 is visible as a 3D virtual image/object on the display screen 128b.

In one embodiment, upon receiving the deep-link 194 directed to the first AR check image 182 from the server 150 and/or receiving the first AR check image 182 from the computing device 120a, the receiver 104 may be verified to login into the application 122 on the computing device 120b using multi-factor authentication, e.g., verifying login credentials 124b, voice features, facial features, fingerprint features, and a magnetically encoded card, among others, similar to that described above with respect to verifying the sender 102.

Realizing the AR Check

The AR check 170 may be realized in response to authenticating the receiver 104, and determining that the receiver 104 is the same person that the AR check 170 is directed to. The AR check 170 may be realized by various methods, as described below.

In one embodiment, the AR check processing engine 154 may realize the AR check 170 in response to receiving the second AR check image 188 from the computing device 120b. In this process, the receiver 104 sends the second AR check image 188 to the server 150 from the application 122 on the computing device 120b. The AR check processing engine 154 compares the first AR check image 182 with the second AR check image 188 to determine whether the second AR check image 188 corresponds to the first AR check image 182.

In one embodiment, the AR check processing engine 154 may compare the first AR check image 182 with the second AR check image 188, and determine whether the second AR check image 182 corresponds to the first AR check image 182 by executing the machine learning algorithm 168. The processor 152 (and/or the AR check processing engine 154) may implement the machine learning algorithm 168 by executing software instructions 160. In one embodiment, the machine learning algorithm 168 may include image processing, image recognition, image segmentation, Object Character Recognition (OCR) algorithm, support vector machine, neural network, random forest, k-means clustering, etc.

The AR check processing engine 154 feeds the first AR check image 182 to the machine learning algorithm 168 to extract features 184 from the first AR check image 182. The features 184 may be represented by an initial vector 186 that comprises numerical values. The features 184 may comprise the name of the sender 102, the name of the receiver 104, the amount 176, the serial number 178, and any other object displayed on the first AR check image 182. Thus, the numerical values of the initial vector 186 may represent the features 184. Likewise, the AR check processing engine 154 feeds the second AR check image 188 to the machine learning algorithm 168 to extract features 190 from the second AR check image 188. The features 190 may be represented by a test vector 192 that comprises numerical values. The features 190 may comprise the name of the sender 102, the name of the receiver 104, the amount 176, the serial number 178, and any other object displayed on the second AR check image 188. Thus, the numerical values of the test vector 192 may represent the features 90.

The AR check processing engine 154 compares the first AR check image 182 with the second AR check image 188. In other words, the AR check processing engine 154 compares the numerical values of the initial vector 186 with their corresponding numerical values of the test vector 192. The AR check processing engine 154 determines whether the second AR check image 188 corresponds to the first AR check image 182. The AR check processing engine 154 may determine that the first AR check image 182 corresponds to the second AR check image 188, if more than a threshold percentage (e.g., 80%, 85%, etc.) of the numerical values of the initial vector 186 are within a threshold range from their corresponding numerical values from the test vector 192. If the AR check processing engine 154 determines that the more than the threshold percentage of the numerical values of the initial vector 186 are within the threshold range from their corresponding numerical values from the test vector 192, the AR check processing engine 154 may determine that the second AR check image 188 corresponds to the first AR check image 182. Otherwise, the AR check processing engine 154 may determine that the second AR check image 188 does not correspond to the first AR check image 182. In response to determining that the second AR check image 188 corresponds to the first AR check image 182, the AR check processing engine 154 deposits or transfers the amount 176 into the account of the receiver 104. Upon transferring the amount 176 into the account of the receiver 104, the AR check processing engine 154 sets the flag parameter 180 to a deactivated state indicating that the AR check 170 is realized and to prevent the AR check 170 from being realized again.

In one embodiment, the AR check processing engine 154 may receive the second AR check image 188 from the AR-enabled ATM 140. For example, the receiver 104 may transfer the second AR check image 188 to the AR-enabled ATM 140 from the computing device 120*b*, when the computing device 120*b* is in D2D communication range of the AR-enabled ATM 140 via wireless protocols, such as WIFI, Bluetooth, etc. In this process, the receiver 104 may access the second AR check image 188 on the view of the camera 126*b* and aim the camera 126*b* toward the display screen 144, such that at least a portion of the display screen 144 can be seen on the view of the camera 126*b*. The second AR check image 188 is transferred to or pasted on the display screen 144, in response to the receiver 104 initiating the transfer by selecting a "paste" option associated with second AR check image 188 (being displayed on the view of the camera 126*b* aimed toward the display screen 144). The AR-enabled ATM 140 may transfer the second AR check image 188 to the server 150 via the network 110. The processor 152 and/or the AR check processing engine 154 may compare the first AR check image 182 with the second AR check image 188, and determine whether the second AR check image 188 corresponds to the first AR check image 182, similar to that described above.

Although, the processes of AR check generation and realization are executed in one server 150. One of ordinary skill in the art would recognize that the process of AR check generation may be performed in a first server, and the process of AR check realization may be performed in a second server, where the first and second servers may be different instances of the server 150.

Realizing the AR Check at the AR-Enabled ATM

In one embodiment, the process of realizing the AR check 170 described above may be performed by an AR-enabled ATM 140. This process is described in more detail in FIG. 4.

In brief, in some cases, upon receiving an image of the AR check 170 at the computing device 120*b*, the receiver 104 may approach an AR-enabled ATM 140 to transfer the second AR check image 188 to the AR-enabled ATM 140, and realize the AR check 170. To this end, the receiver 104 may display and access the image of the received AR check 170 on the view of the camera 126*b*, and aim the camera 126*b* toward the display screen 144, such that at least a portion of the display screen 144 can be seen on the view of the camera 126*b*.

The second AR check image 188 can be transferred to the AR-enabled ATM 140, in response to the receiver 104 initiating the transfer by selecting a "paste" option associated with second AR check image 188 displayed on the view of the camera 126*b* aimed at the display screen 144, similar to that described above. As such, the second AR check image 188 is pasted on the display screen 144.

Upon receiving the second AR check image 188, the ATM 140 may use the AR scanner 142 to scan the second AR check image 188. The AR scanner 142 may be implemented by the processor 410 (see FIG. 4) and execute the machine learning algorithm 168 to extract features 190 from the second AR check image 188, similar to that described above. The ATM 140 (e.g., via the AR check processing engine 154) may compare the second AR check image 188 with the first AR check image 182, and determine whether the second AR check image 188 corresponds to the first AR check image 182, similar to that described above. In response to determining that the second AR check image 188 corresponds to the first AR check image 182, the ATM 140 may dispense cash equivalent to the amount 176 from a cash dispenser to the receiver 104. Alternatively, the ATM 140 may transfer the amount 176 to an account associated with the receiver 104 in response to the receiver 104 operating user interfaces of the ATM 140 and requesting to transfer the amount 176 to their account.

In one embodiment, before receiving the second AR check image 188, the AR-enabled ATM 140 may authenticate the receiver 104 by verifying a pin number associated with an account of the receiver 104, voice features, facial features, fingerprint features, and a magnetically encoded card associated with the receiver 104. In one embodiment, the system 100 may be configured to provide an option to the sender 102 and receiver 104 to print the AR check 170.

In one embodiment, system 400 may be configured to generate and realize any AR object 170. For example, the AR check processing engine 154 may receive an image of an object (e.g., an image of a pen, a doll, a landscape scene, etc.) from the sender 102, feed the image to the computer vision algorithm 162 to generate an image of the AR object 170, and associate an amount 176 (as indicated by the sender 102) to the AR object 170. To uniquely identify the AR object 170, the AR check processing engine 154 may identify a set of points (or pixels) of interest from the image of the AR object 170, and generate a unique code 174 to the set of points (or pixels). The AR check processing engine 154 may treat the AR object 170 as an object associated with the amount 176 directed to the receiver 104. Upon receipt, the receiver 104 may upload the image of the AR object 170 to the application 122 to extract its features 190, and deposit its amount 176 to the account of the receiver 104. Alternatively, the receiver 104 may receive cash equal to the amount 176 by transferring the image of the AR object 170 to the AR-enabled ATM 140.

Example Method for AR Check Generation

Figure 2:
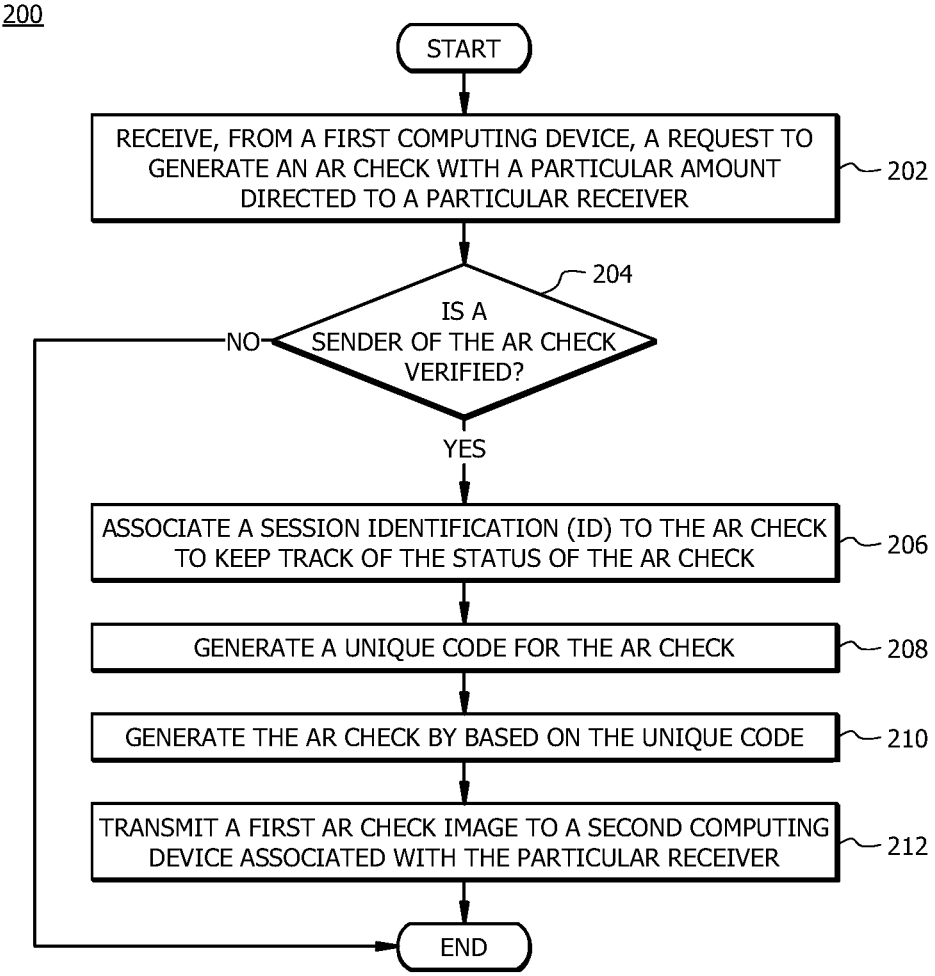
FIG. 2 illustrates an example flowchart of a method, at a server, for AR check generation.

FIG. 2 illustrates an example flowchart of a method 200 for generating AR checks 170. Modifications, additions, or omissions may be made to method 200. Method 200 may include more, fewer, or other steps. For example, steps may be performed in parallel or in any suitable order. While at times discussed as the system 100, processor 152, AR check processing engine 154, or components of any of thereof performing steps, any suitable system or components of the system may perform one or more steps of the method 200. For example, one or more steps of method 200 may be implemented, at least in part, in the form of software instructions 160 of FIG. 1, stored on non-transitory, tangible, machine-readable media (e.g., memory 158 of FIG. 1) that when run by one or more processors (e.g., processor 152 of FIG. 1) may cause the one or more processors to perform steps 202-212.

Method 200 begins at step 202 where the AR check processing engine 154 receives, from a first computing device 120a, a request 106 to generate an AR check 170 with a particular amount 176 directed to a particular receiver 104. For example, the AR check processing engine 154 may receive the request 106 from the computing device 120a when the sender 102 logs into the application 122 with their login credentials 124a, and uses user interfaces of the application 122 to send the request 106. The request 106 may include sender profile 132 (e.g., name of the sender 102, login credentials 124, etc.), receiver profile 134 (e.g., name, phone number, address, etc., associated with the receiver 104), and the particular amount 176.

At step 204, the AR check processing engine 154 determines whether the sender 102 is verified. The AR check processing engine 154 may determine whether the sender 102 is verified by using multi-factor authentication methods, including verifying login credentials 124a, voice features, facial features, fingerprint features, and a magnetically encoded card associated with the sender 102, similar to that described above in FIG. 1. If the AR check processing engine 154 determines that the sender 102 is verified, method 200 proceeds to step 206. Otherwise, method 200 terminates.

At step 206, the AR check processing engine 154 associates a session ID 172 to the AR check 170 to keep track of the status of the AR check 170. The session ID 172 may include a number that uniquely associated with the AR check 170.

At step 208, the AR check processing engine 154 generates a unique code 174 for the AR check 170. For example, the AR check processing engine 154 may generate the unique code 174 by converting the name of the sender 102, the name of the receiver 104, the particular amount 176, a serial number 178, and other information provided in the request 106 into the a hexadecimal format, binary format, etc., similar to that described above in FIG. 1.

At step 210, the AR check processing engine 154 generates the AR check 170 based on the unique code 174 as an input. In this process, the AR check processing engine 154 feeds the unique code 174 to the computer vision algorithm 162 to extracts the name of the sender 102, the name of the receiver 104, the particular amount 176, a serial number 178, and any other information in the unique code 174, digitizes them, and display them on the AR check 170 on their appropriate positions, similar to that described above in FIG. 1.

At step 212, the AR check processing engine 154 transmits a first AR check image 182 to a second computing device 120b associated with the particular receiver 104. In this process, for example, the AR check processing engine 154 may transmit the deep-link 194 directed to the first AR check image 182 to the second computing device 120b, e.g., via a text message, an image message, an attachment file, an email, and the like, similar to that described above in FIG. 1. In another example, in some cases where the computing device 120a is in D2D communication range from the computing device 120b, the AR check processing engine 154 may transmit the first AR check image 182 to the computing device 120a, in response to receiving a request from the sender 102 to send the first AR check image 182. In such cases, the first AR check image 182 may be pasted from the computing device 120a to the computing device 120b, when at least a portion of the display screen 128b is visible on the camera 126a aimed at the display screen 128b, and the first AR check image 182 is displayed on the view of the camera 126a, similar to that described above in FIG. 1.

Example Method for AR Check Realization by a Server

Figure 3:
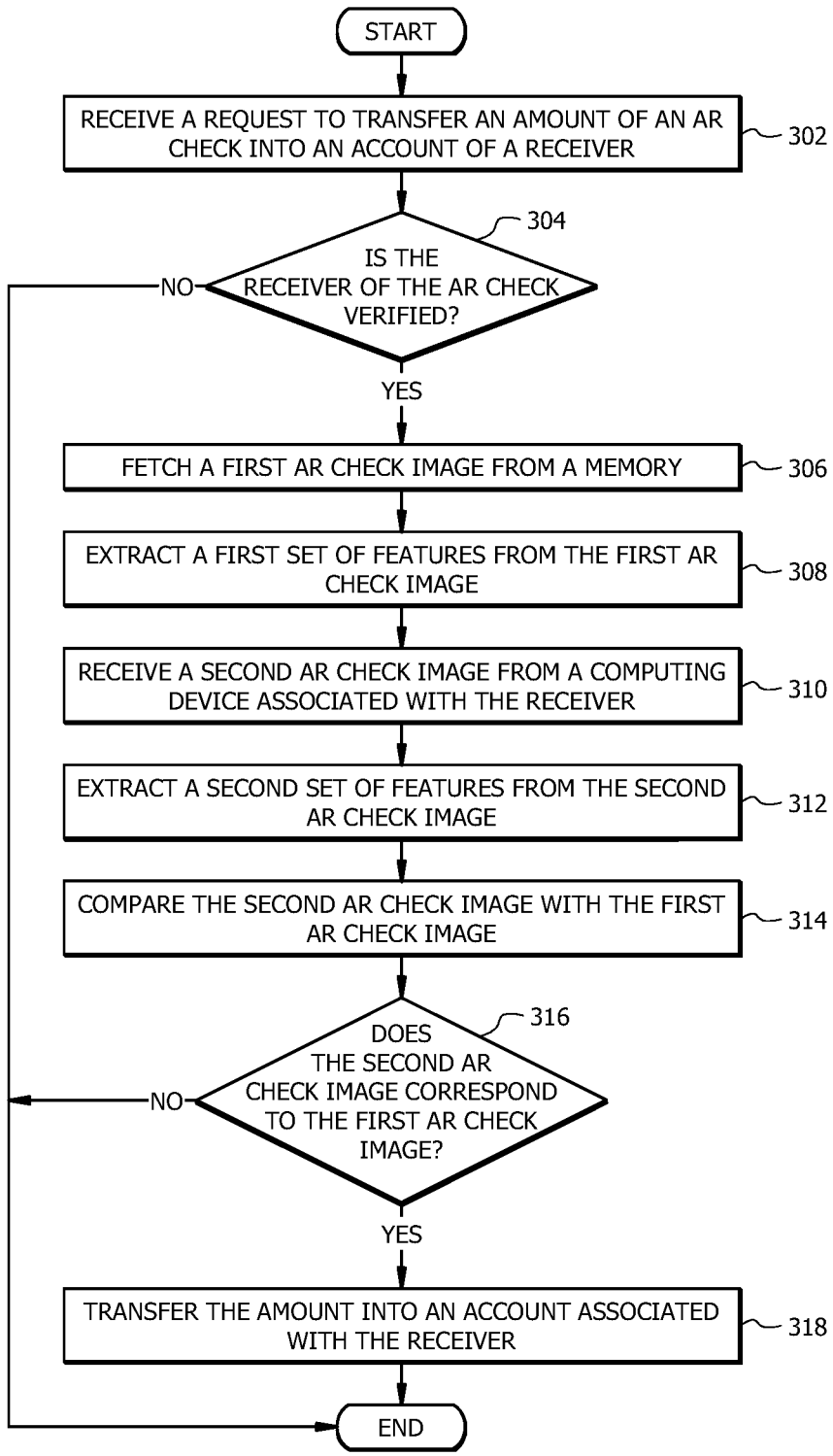
FIG. 3 illustrates an example flowchart of a method, at a server, for AR check realization.

FIG. 3 illustrates an example flowchart of a method 300 for realizing AR checks 170. Modifications, additions, or omissions may be made to method 300. Method 300 may include more, fewer, or other steps. For example, steps may be performed in parallel or in any suitable order. While at times discussed as the system 100, processor 152, AR check processing engine 154, or components of any of thereof performing steps, any suitable system or components of the system may perform one or more steps of the method 300. For example, one or more steps of method 300 may be implemented, at least in part, in the form of software instructions 160 of FIG. 1, stored on non-transitory, tangible, machine-readable media (e.g., memory 158 of FIG. 1) that when run by one or more processors (e.g., processor 152 of FIG. 1) may cause the one or more processors to perform steps 302-318.

At step 302, the AR check processing engine 154 receives a request to transfer an amount 176 associated with the AR check 170 into an account of a receiver 104. For example, the AR check processing engine 154 may receive the request from a computing device 120b associated with the receiver 104.

At step 304, the AR check processing engine 154 determines whether the receiver 104 is verified. The AR check processing engine 154 may determine whether the receiver 104 is verified by using multi-factor authentication methods, including verifying login credentials 124b, voice features, facial features, fingerprint features, and a magnetically encoded card associated with the receiver 104, similar to that described above in FIG. 1.

At step 306, the AR check processing engine 154 fetches a first AR check image 182 from memory 158. The first AR check image 182 may be stored in memory 158 when the AR check processing engine 154 generates the AR check 170.

At step 308, the AR check processing engine 154 extracts a first set of features 184 from the first AR check image 182. For example, the AR check processing engine 154 may extract the first set of features 184 by feeding the first AR check image 182 to the machine learning algorithm 168, similar to that described in FIG. 1. The first set of features 184 may be represented by the initial vector 186. The first set of features 184 may include or represent information displayed on the first AR check image 182, including the name of the sender 102, the name of the receiver 104, the amount 176, and the serial number 178.

At step 310, the AR check processing engine 154 receives a second AR check image 188 from the computing device 120b associated with the receiver 104. For example, the AR check processing engine 154 may receive the second AR check image 188 when the receiver 104 uploads the second AR check image 188 into the application 122 from the computing device 102b.

At step 312, the AR check processing engine 154 extracts a second set of features 190 from the second AR check image 188. For example, the AR check processing engine 154 may extract the second set of features 190 by feeding the second AR check image 188 to the machine learning algorithm 168, similar to that described in FIG. 1. The second set of features 190 may be represented by the test vector 192. The second set of features 190 may include or represent information displayed on the second AR check image 188, including the name of the sender 102, the name of the receiver 104, the amount 176, and the serial number 178.

At step 314, the AR check processing engine 154 compares the second AR check image 188 with the first AR check image 182. In this process, the AR check processing engine 154 compares each numerical value from the initial vector 186 with its corresponding numerical value from the test vector 192, similar to that described in FIG. 1.

At step 316, the AR check processing engine 154 determines whether the second AR check image 188 corresponds to the first AR check image 182. For example, the AR check processing engine 154 determines that the second AR check image 188 corresponds to the first AR check image 182, if more than a threshold percentage (e.g., 80%, 85%, etc.) of the numerical values of the test vector 192 are within a threshold range (e.g., ±5%, ±10%, etc.) from their corresponding numerical values from the initial vector 186, similar to that described above in FIG. 1. If the AR check processing engine 154 determines that the second AR check image 188 corresponds to the first AR check image 182, method 300 proceeds to step 318. Otherwise, method 300 terminates.

At step 318, the AR check processing engine 154 transfers the amount 176 into an account associated with the receiver 104.

Example System for AR Check Realization at an AR-Enabled ATM

Figure 4:
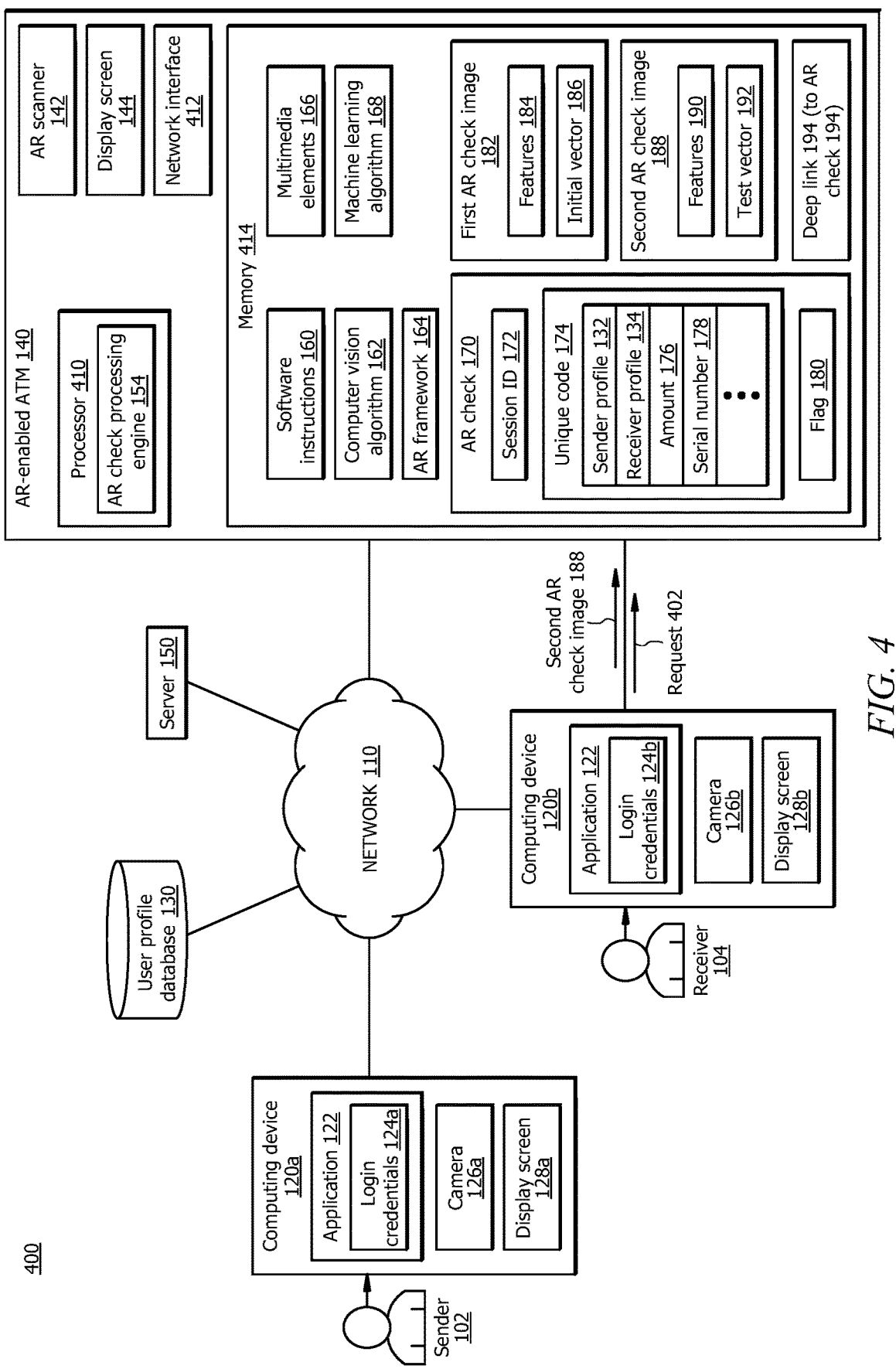
FIG. 4 illustrates an embodiment of a system configured for AR check realization at an AR-enabled ATM terminal.

FIG. 4 illustrates one embodiment of a system 400 for AR check realization at an AR-enabled ATM 140. In one embodiment, system 400 comprises an AR-enabled ATM 140. In some embodiments, system 400 further comprises network 110, computing devices 120a and 120b, user profile database 130, and server 150. Aspects of certain components of system 400 are described in FIG. 1-3, and additional aspects are described below. In one embodiment, the process of realizing the AR check 170 described in FIG. 1 may be performed by the AR-enabled ATM 140. The AR-enabled ATM 140 comprises a processor 410 in signal communication with a memory 414. Memory 414 stores software instructions 160 that when executed by the processor 410 cause the processor 410 to perform one or more functions described herein. For example, when the software instructions 160 are executed, the processor 410 executes the AR check processing engine 154 to validate an AR check 170 and in response to validation, trigger the AR-enabled ATM to dispense cash equal to an amount 176 of the AR check 170, or alternatively, transfer the amount 176 into an account of a receiver 104 of the AR check 170. In other embodiments, system 400 may not have all of the components listed and/or may have other elements instead of, or in addition to, those listed above.

System Components

In one embodiment, the AR-enabled ATM 140 comprises the AR scanner 142, display screen 144, processor 410, network interface 412, and memory 414. The components of the AR-enabled ATM 140 are operably coupled to each other. In other embodiments, the AR-enabled ATM 140 may not have all of the components listed and/or may have other elements instead of, or in addition to, those listed above.

Processor 410 comprises one or more processors operably coupled to the memory 414. The processor 410 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 410 may be a programmable logic device, a microcontroller, a microprocessor, or any suitable combination of the preceding. The one or more processors are configured to process data and may be implemented in hardware or software. For example, the processor 410 may be 8-bit, 16-bit, 32-bit, 64-bit, or of any other suitable architecture. The processor 410 may include an arithmetic logic unit (ALU) for performing arithmetic and logic operations, processor 410 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 160) to implement the AR check processing engine 154. In this way, processor 410 may be a special-purpose computer designed to implement the functions disclosed herein. In an embodiment, the processor 410 is implemented using logic units, FPGAs, ASICs, DSPs, or any other suitable hardware. The processor 410 is configured to operate as described in FIGS. 4 and 5. For example, the processor 410 may be configured to perform one or more steps of method 500 as described in FIG. 5.

Network interface 412 is configured to enable wired and/or wireless communications (e.g., via network 110). The network interface 412 is configured to communicate data between the ATM 140 and other devices (e.g., computing devices 120a and 120b and server 150), databases (e.g., user profile database 130), systems, or domains. For example, the network interface 412 may comprise a WIFI interface, a local area network (LAN) interface, a wide area network (WAN) interface, a modem, a switch, or a router. The processor 410 is configured to send and receive data using the network interface 412. The network interface 412 may be configured to use any suitable type of communication protocol as would be appreciated by one of ordinary skill in the art.

Memory 414 may be volatile or non-volatile and may comprise a read-only memory (ROM), random-access memory (RAM), ternary content-addressable memory (TCAM), dynamic random-access memory (DRAM), and static random-access memory (SRAM). Memory 414 may be implemented using one or more disks, tape drives, solid-state drives, and/or the like. Memory 414 is operable to store the software instructions 160, computer vision algorithm 162, AR framework 164, multimedia elements 166, machine learning algorithm 168, AR checks 170, first AR check image 182, second AR check image 188, deep-links 194 (to images of AR checks 170), and/or any other data or instructions. The software instructions 160 may comprise any suitable set of instructions, logic, rules, or code operable to execute the processor 410.

In one embodiment, the AR-enabled ATM 140 may be configured to generate AR checks 170 by implementing the software instructions 160 and computer vision algorithm 162 being executed by the processor 410 and AR check processing engine 154, similar to that described in FIG. 1 with respect to the server 150.

In one embodiment, the system 400 may be configured to provide an option for the receiver 104 to receive a print of the AR check 170 from the AR-enabled ATM 140, or any other device.

In one embodiment, the AR-enabled ATM 140 may be configured to validate and realize any AR object 170, including an AR gift card, AR image, AR ticket, etc.

Example Method for AR Check Realization at an AR-Enabled ATM

Figure 5:
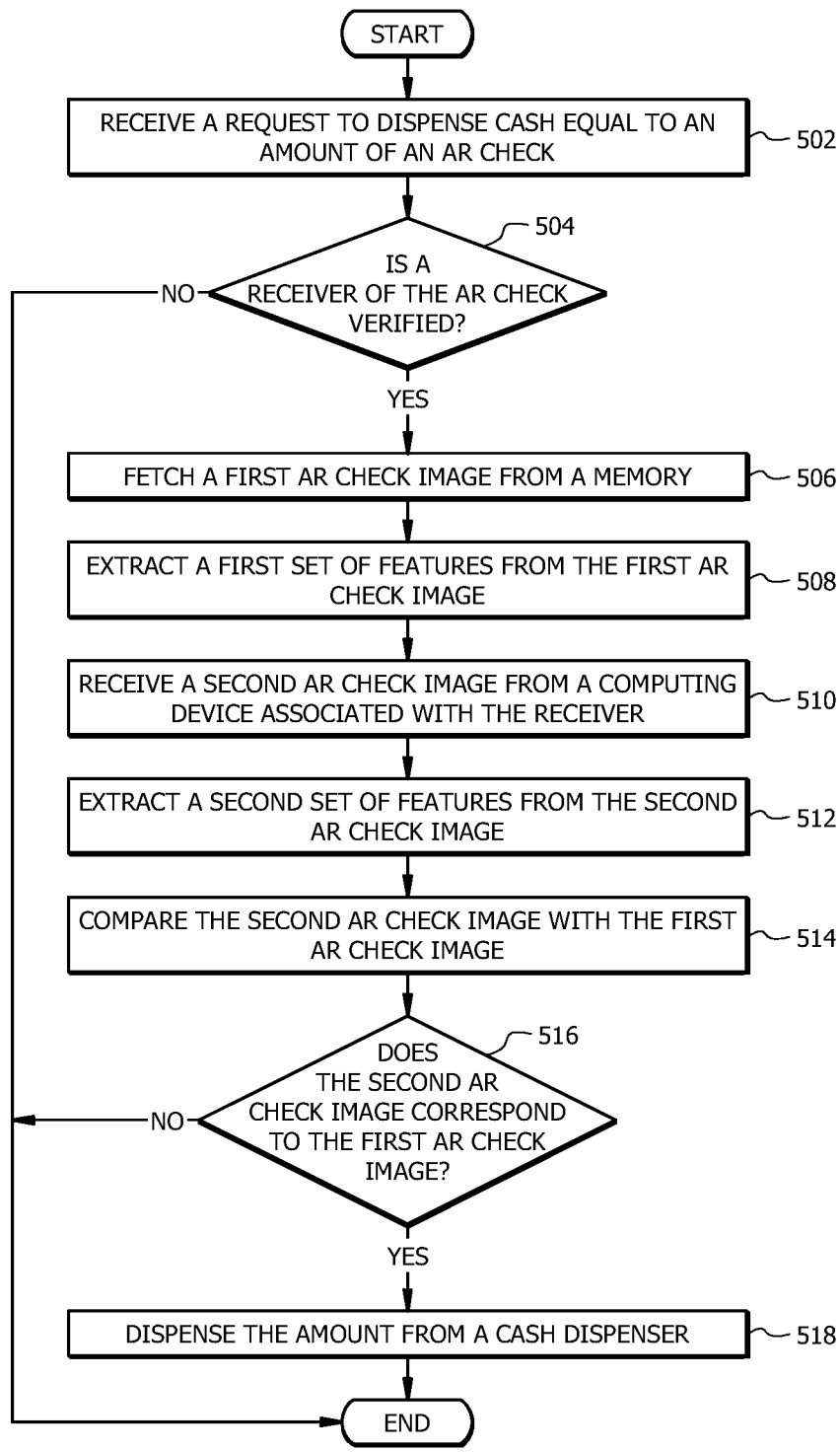
FIG. 5 illustrates an example flowchart of a method, at an AR-enabled ATM, for AR check realization.

FIG. 5 illustrates an example flowchart of a method 500 for realizing AR checks 170. Modifications, additions, or omissions may be made to method 500. Method 500 may include more, fewer, or other steps. For example, steps may be performed in parallel or in any suitable order. While at times discussed as the system 400, processor 410, AR check processing engine 154, or components of any of thereof performing steps, any suitable system or components of the system may perform one or more steps of the method 500. For example, one or more steps of method 500 may be implemented, at least in part, in the form of software instructions 160 of FIG. 1, stored on non-transitory, tangible, machine-readable media (e.g., memory 414 of FIG. 4) that when run by one or more processors (e.g., processor 410 of FIG. 4) may cause the one or more processors to perform steps 502-518.

Method 500 begins at step 502 where the AR check processing engine 154 receives a request 402 to dispense cash equal to an amount of an AR check 170. For example, the AR check processing engine 154 may receive the request 402 from a computing device 120b associated with a receiver 104 of the AR check 170.

At step 504, the AR check processing engine 154 determines whether the receiver 104 is verified. The AR check processing engine 154 may determine whether the receiver 104 is verified by using multi-factor authentication methods, including verifying a pin number of an account, voice features, facial features, fingerprint features, and a magnetically encoded card associated with the receiver 104, similar to that described above in FIG. 1.

At step 506, the AR check processing engine 154 fetches a first AR check image 182 from memory 414. For example, the AR check processing engine 154 may receive the first AR check image 182 from the server 150, and store the first AR check image 182 in the memory 414 for AR check validation.

At step 508, the AR check processing engine 154 extracts a first set of features 184 from the first AR check image 182, similar to that described in step 308 of method 300 in FIG. 3, and FIGS. 1 and 4.

At step 510, the AR check processing engine 154 receives a second AR check image 188 from the computing device 120b associated with the receiver 104. For example, the AR check processing engine 154 may receive the second AR check image 188 when the receiver selects the second AR check image 188 being displayed on a view of the camera 126b on the display screen 128b, and aims the camera 126b toward the display screen 144 (associated with the AR-enabled ATM 140), such that at least a portion of the display screen 144 can be seen on the view of the camera 126b on the display screen 128b, similar to that described in FIGS. 1 and 4.

At step 512, the AR check processing engine 154 extracts a second set of features 190 from the second AR check image 188, similar to that described in step 312 of method 300 in FIG. 3, and FIGS. 1 and 4.

At step 514, the AR check processing engine 154 compares the second AR check image 188 with the first AR check image 182. In this process, the AR check processing engine 154 compares each numerical value from the initial vector 186 with its corresponding numerical value from the test vector 192, similar to that described in FIG. 1.

At step 516, the AR check processing engine 154 determines whether the second AR check image 188 corresponds to the first AR check image 182, similar to that described in FIGS. 1 and 4. If it is determines that the second AR check image 188 corresponds to the first AR check image 182, method 500 proceeds to step 518. Otherwise, method 500 terminates.

At step 518, the AR check processing engine 154 dispenses the amount 176 from a cash dispenser of the AR-enabled ATM 140. Alternatively, the AR check processing engine 154 may transfer the amount 176 into an account of the receiver 104.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An Augmented Reality (AR)-enabled Automated Teller Machine (ATM), comprising:
   a memory operable to store a first image of an AR document when the AR document is generated, wherein:
      the AR document comprises a plurality of AR markers indicating corresponding positions of a plurality of features;
      the first image of the AR document is represented as a digital image in a view of a camera in three-dimensional space; and
      the first image of the AR document displays a first set of features comprising a first string representing a name of a sender positioned at a first AR marker in the AR document, a second string representing a name of a receiver positioned at a second AR marker in the AR document, a first number representing an amount of the AR document positioned at a third AR marker in the AR document, and a second number representing a serial number positioned at a fourth AR marker in the AR document; and
   a processor, operably coupled with the memory, and configured to:
      receive a request to realize the AR document by dispensing cash equal to the amount;
      transmit a hyperlink directed to the first image of the AR document to a computing device associated with the receiver, the hyperlink enabling a multi-factor authentication operation to verify the name of the receiver positioned at the second AR marker in the AR document;
      in response to verifying the name of the receiver, receive a second image of the AR document from the computing device associated with the receiver, the computing device being separate from the AR-enabled ATM;
      scan the second image of the AR document to extract a second set of features from the second image of the AR document, wherein the second set of features comprises a third string representing the name of the sender positioned at a fifth AR marker in the AR document, a fourth string representing the name of the receiver positioned at a sixth AR marker in the AR document, a third number representing the amount positioned at a seventh AR marker in the AR document, and a fourth number representing the serial number positioned at an eighth AR marker in the AR document;
      identify a first vector that represents a first feature of the first set of features displayed on the first image of the AR document;
      identify a second vector that represents a second feature of the second set of features extracted from the second image of the AR document;
      compare a numerical value of the second vector that represents the second feature of the second image of the AR document with a numerical value of the first vector that represents the first feature of the first image of the AR document;
      in response to the numerical value of the second vector corresponding to at least a threshold percentage of the numerical value of the first vector, determine that the second feature corresponds to the first feature;
      in response to determining that the second feature corresponds to the first feature, determine that the second image of the AR document corresponds to the first image of the AR document; and
      in response to determining that the second image of the AR document corresponds to the first image of the AR document, dispense cash equal to the amount for the receiver.

2. The AR-enabled ATM of claim 1, wherein the computing device comprises at least one of a mobile phone, a laptop, a desktop computer, and a smartwatch.

3. The AR-enabled ATM of claim 1, wherein the processor is further configured to:
   in conjunction with identifying the first vector that represents the first feature of the first set of features displayed on the first image of the AR document, identify a third vector that represents a third feature of the first set of features displayed on the first image of the AR document;
   identify a fourth vector that represents a fourth feature of the second set of features extracted from the second ima2e of the AR document;
   compare a numerical value of the fourth vector that represents the fourth feature of the second image of the AR document with a numerical value of the third vector that represents the third feature of the first image of the AR document;
   in response to the numerical value of the fourth vector corresponding to at least a threshold percentage of the numerical value of the third vector, determine that the fourth feature corresponds to the third feature;
   in response to determining that the fourth feature corresponds to the third feature, determine that the fourth image of the AR document corresponds to the third image of the AR document; and
   in response to determining that the fourth image of the AR document corresponds to the third image of the AR document, dispense the cash equal to the amount for the receiver.

4. The AR-enabled ATM of claim 1, wherein:
   the memory is further configured to store a flag parameter indicating whether the AR document is realized, such that when the AR document is not realized, the flag parameter is set to an activated state, and when the AR document is realized, the flag parameter is set to a deactivated state; and
   the processor is further configured to, in response to dispensing cash equal to the amount, set the flag parameter to the deactivated state.

5. The AR-enabled ATM of claim 1, wherein receiving the second image of the AR document comprises receiving the second image of the AR document from the computing device when the computing device is within a Device-to-Device (D2D) communication range from the AR-enabled ATM, such that the second image of the AR document, visible on a view of a camera associated with the computing device, is copied from the computing device and transferred to the AR-enabled ATM when at least a portion of a display screen of the AR-enabled ATM is visible from the camera.

6. The AR-enabled ATM of claim 1, wherein the processor receives the request to realize the AR document, in response to verifying a pin number associated with an account of the receiver.

7. The AR-enabled ATM of claim 1, wherein the processor is further configured to, in response to determining that the second image of the AR document corresponds to the first image of the AR document, transfer the amount into an account associated with the receiver.

8. A method for Augmented Reality (AR) document realization at an AR-enabled Automated Teller Machine (ATM), comprising:

receiving, at an AR-enabled ATM, a request to realize an AR document, wherein:
- realizing the AR document corresponds to dispensing cash equal to an amount of the AR document; and
- the AR document comprises a plurality of AR markers indicating corresponding positions of a plurality of features;

fetching a first image of the AR document from a memory, wherein:
- the first image of the AR document is stored in the memory when the AR document is generated;
- the first image of the AR document is represented as a digital image in a view of a camera in three-dimensional space; and
- the first image of the AR document displays a first set of features comprising a first string representing a name of a sender positioned at a first AR marker in the AR document, a second string representing a name of a receiver positioned at a second AR marker in the AR document, a first number representing the amount of the AR document positioned at a third AR marker in the AR document, and a second number representing a serial number positioned at a fourth AR marker in the AR document;

transmitting a hyperlink directed to the first image of the AR document to a computing device associated with the receiver, the hyperlink enabling a multi-factor authentication operation to verify the name of the receiver positioned at the second AR marker in the AR document;

in response to verifying the name of the receiver, receiving a second image of the AR document from the computing device associated with the receiver, the computing device being separate from the AR-enabled ATM;

scanning the second image of the AR document to extract a second set of features from the second image of the AR document, wherein the second set of features comprises a third string representing the name of the sender positioned at a fifth AR marker in the AR document, a fourth string representing the name of the receiver positioned at a sixth AR marker in the AR document, a third number representing the amount positioned at a seventh AR marker in the AR document, and a fourth number representing the serial number positioned at an eighth AR marker in the AR document;

identifying a first vector that represents a first feature of the first set of features displayed on the first image of the AR document;

identifying a second vector that represents a second feature of the second set of features extracted from the second image of the AR document;

comparing a numerical value of the second vector that represents the second feature of the second image of the AR document with a numerical value of the first vector that represents the first feature of the first image of the AR document;

in response to the numerical value of the second vector corresponding to at least a threshold percentage of the numerical value of the first vector, determining that the second feature corresponds to the first feature;

in response to determinin₂ that the second feature corresponds to the first feature, determining that the second image of the AR document corresponds to the first image of the AR document; and in response to determining that the second image of the AR document corresponds to the first image of the AR document, dispensing cash equal to the amount for the receiver.

9. The method of claim 8, wherein the computing device comprises at least one of a mobile phone, a laptop, a desktop computer, and a smartwatch.

10. The method of claim 8, the method further comprising:

in conjunction with identifying the first vector that represents the first feature of the first set of features displayed on the first ima2e of the AR document, identifying a third vector that represents a third feature of the first set of features displayed on the first image of the AR document;

identifying a fourth vector that represents a fourth feature of the second set of features extracted from the second image of the AR document;

comparing a numerical value of the fourth vector that represents the fourth feature of the second image of the AR document with a numerical value of the third vector that represents the third feature of the first image of the AR document;

in response to the numerical value of the fourth vector corresponding to at least a threshold percentage of the numerical value of the third vector, determining that the fourth feature corresponds to the third feature;

in response to determinin2 that the fourth feature corresponds to the third feature, determining that the fourth image of the AR document corresponds to the third image of the AR document; and in response to determining that the fourth ima2e of the AR document corresponds to the third image of the AR document, dispensing the cash equal to the amount for the receiver.

11. The method of claim 8, further comprising:

storing a flag parameter indicating whether the AR document is realized, such that when the AR document is not realized, the flag parameter is set to an activated state, and when the AR document is realized, the flag parameter is set to a deactivated state; and in response to dispensing cash equal to the amount, setting the flag parameter to the deactivated state.

12. The method of claim 8, wherein receiving the second image of the AR document comprises receiving the second image of the AR document from the computing device when the computing device is within a Device-to-Device (D2D) communication range from the AR-enabled ATM, such that the second image of the AR document, visible on a view of a camera associated with the computing device, is copied from the computing device and transferred to the AR-enabled ATM when at least a portion of a display screen of the AR-enabled ATM is visible from the camera.

13. The method of claim 8, wherein receiving the request to realize the AR document comprises receiving the request in response to verifying a pin number associated with an account of the receiver.

14. The method of claim 8, further comprising, in response to determining that the second image of the AR document corresponds to the first image of the AR document, transferring the amount into an account associated with the receiver.

15. A non-transitory computer-readable medium storing instructions that when executed by a processor cause the processor to:

receive, at an Augmented Reality (AR)-enabled Automated Teller Machine (ATM), a request to realize an AR document, wherein:
  realizing the AR document corresponds to dispensing cash equal to an amount of the AR document; and
  the AR document comprises a plurality of AR markers indicating corresponding positions of a plurality of features;
fetch a first image of the AR document from a memory, wherein:
  the first image of the AR document is stored in the memory when the AR document is generated;
  the first image of the AR document is represented as a digital image in a view of a camera in three-dimensional space; and
  the first image of the AR document displays a first set of features comprising a first string representing a name of a sender positioned at a first AR marker in the AR document, a second string representing a name of a receiver positioned at a second AR marker in the AR document, a first number representing the amount of the AR document positioned at a third AR marker in the AR document, and a second number representing a serial number positioned at a fourth AR marker in the AR document;
transmit a hyperlink directed to the first image of the AR document to a computing device associated with the receiver, the hyperlink enabling a multi-factor authentication operation to verify the name of the receiver positioned at the second AR marker in the AR document;
in response to verifying the name of the receiver, receive a second image of the AR document from the computing device associated with the receiver, the computing device being separate from the AR-enabled ATM;
scan the second image of the AR document to extract a second set of features from the second image of the AR document, wherein the second set of features comprises a third string representing the name of the sender positioned at a fifth AR marker in the AR document, a fourth string representing the name of the receiver positioned at a sixth AR marker in the AR document, a third number representing the amount positioned at a seventh AR marker in the AR document, and a fourth number representing the serial number positioned at an eighth AR marker in the AR document;
identify a first vector that represents a first feature of the first set of features displayed on the first image of the AR document;
identify a second vector that represents a second feature of the second set of features extracted from the second image of the AR document;
compare a numerical value of the second vector that represents the second feature of the second image of the AR document with a numerical value of the first vector that represents the first feature of the first image of the AR document;
in response to the numerical value of the second vector corresponding to at least a threshold percentage of the numerical value of the first vector, determining that the second feature corresponds to the first feature;
in response to determinin2 that the second feature corresponds to the first feature, determine that the second image of the AR document corresponds to the first image of the AR document; and
in response to determining that the second image of the AR document corresponds to the first image of the AR document, dispense cash equal to the amount for the receiver.

16. The non-transitory computer readable medium of claim 15, wherein the computing device comprises at least one of a mobile phone, a laptop, a desktop computer, and a smartwatch.

17. The non-transitory computer readable medium of claim 15, wherein the instructions, when executed by the processor, further cause the processor to:
  in conjunction with identifying the first vector that represents the first feature of the first set of features displayed on the first image of the AR document, identify a third vector that represents a third feature of the first set of features displayed on the first image of the AR document;
  identify a fourth vector that represents a fourth feature of the second set of features extracted from the second image of the AR document;
  compare a numerical value of the fourth vector that represents the fourth feature of the second image of the AR document with a numerical value of the third vector that represents the third feature of the first image of the AR document;
  in response to the numerical value of the fourth vector corresponding to at least a threshold percentage of the numerical value of the third vector, determine that the fourth feature corresponds to the third feature;
  in response to determining that the fourth feature corresponds to the third feature, determine that the fourth image of the AR document corresponds to the third image of the AR document; and
  in response to determining that the fourth image of the AR document corresponds to the third image of the AR document, dispense the cash equal to the amount for the receiver.

18. The non-transitory computer readable medium of claim 15, wherein the instructions, when executed by the processor, further cause the processor to:
  store a flag parameter indicating whether the AR document is realized, such that when the AR document is not realized, the flag parameter is set to an activated state, and when the AR document is realized, the flag parameter is set to a deactivated state; and
  in response to dispensing cash equal to the amount, set the flag parameter to the deactivated state.

19. The non-transitory computer readable medium of claim 15, wherein receiving the second image of the AR document comprises receiving the second image of the AR document from the computing device when the computing device is within a Device-to-Device (D2D) communication range from the AR-enabled ATM, such that the second image of the AR document, visible on a view of a camera associated with the computing device, is copied from the computing device and transferred to the AR-enabled ATM when at least a portion of a display screen of the AR-enabled ATM is visible from the camera.

20. The non-transitory computer readable medium of claim 15, wherein the instructions when executed by the processor, further cause the processor to, in response to determining that the second image of the AR document corresponds to the first image of the AR document, transfer the amount into an account associated with the receiver.

* * * * *